United States Patent [19]

Choi

[11] Patent Number: 5,598,224
[45] Date of Patent: Jan. 28, 1997

[54] CIRCUIT FOR SUPERIMPOSING TEXT ON AN IMAGE

[75] Inventor: Hae-min Choi, Kwacheon, Rep. of Korea

[73] Assignee: Samsung Electronics Co., Ltd., Kyungki-do, Rep. of Korea

[21] Appl. No.: 409,603

[22] Filed: Mar. 24, 1995

[30] Foreign Application Priority Data

Dec. 20, 1994 [KR] Rep. of Korea .................. 94-35345

[51] Int. Cl.$^6$ ........................................ H04N 9/76
[52] U.S. Cl. ................. 348/599; 348/600; 348/564; 348/569; 348/468
[58] Field of Search ................... 348/461, 468, 348/517, 563, 564, 569, 570, 584, 586, 587, 589, 598, 599, 600; H04N 9/74, 9/75, 9/76

[56] References Cited

U.S. PATENT DOCUMENTS

| 4,532,540 | 7/1985 | Wine ................................. 348/589 |
| 4,639,765 | 1/1987 | D'Hont ............................. 348/517 |
| 5,051,817 | 9/1991 | Takano ............................. 348/600 |

FOREIGN PATENT DOCUMENTS

| 0178314 | 6/1994 | Japan .................. H04N 9/74 |

Primary Examiner—David E. Harvey
Attorney, Agent, or Firm—Sughrue, Mion, Zinn, Macpeak & Seas

[57] ABSTRACT

A superimposing circuit includes an N-bit transmission gate for transmitting N-bit RGB data in a pixel unit in response to a blanking signal; a signal synthesizer for generating R, G and B signals, by separating each component of R, G and B from the N-1 least significant bits of the N-bit RGB data output from the transmission gate; an RGB matrix for receiving the R, G and B signals and generating a luminance signal, first and second color difference signals; a luminance signal amplifier for amplifying the luminance signal; a pair of modulators for modulating the first and second color difference signals, respectively; a first mixer for synthesizing the modulated color difference signal and generating a carrier color signal; a second mixer for synthesizing the carrier color signal, the amplified luminance signal and a complex synchronizing signal and generating a complex image signal; an attenuator for attenuating an external image signal; an image signal selector for selectively outputting the attenuated external image signal or the complex image signal according to the most significant bit value of the N-bit RGB data; and an output amplifier for amplifying the selected image signal. Therefore, the internal and external image signals can be superimposed at high speed in a pixel unit.

4 Claims, 1 Drawing Sheet

CIRCUIT FOR SUPERIMPOSING TEXT ON AN IMAGE

BACKGROUND OF THE INVENTION

The present invention relates to a superimposing circuit of an image apparatus, and more particularly, to a superimposing circuit whereby an RGB signal can be superimposed onto an external image signal in a pixel unit.

An image-song accompaniment apparatus requires high speed superimpose technology for processing lyrics to caption on an external background image signal. Generally, while the external background image signal is an analog signal of NTSC mode, the caption signal is first provided as digital data, and then undergoes a mixing process with respect to the background signal, after being converted into an analog signal by a digital-to-analog converter. Since this mixing process is for overlapping the analog signals, the circuitry is complicated and synchronization with the external image signal is difficult.

SUMMARY OF THE INVENTION

To overcome the above problem, it is an object of the present invention to provide a superimposing circuit whereby superimposing can be performed in a pixel unit.

To achieve the above object, the circuit according to the present invention comprises: an N-bit transmission gate for transmitting N-bit RGB data in a pixel unit in response to a blanking signal; a signal synthesizer for generating R, G and B signals, by separating each component of R, G and B from the N-1 least significant bits of N-bit RGB data output from the transmission gate; an RGB matrix for receiving R, G and B signals and generating a luminance signal, and first and second color difference signals; a luminance signal amplifier for amplifying the luminance signal; a pair of modulators for modulating the first and second color difference signals; a first mixer for synthesizing the modulated color difference signals and generating a carrier color signal; a second mixer for synthesizing the carrier color signal, the amplified luminance signal and a complex synchronizing signal and generating a complex image signal; an attenuator for attenuating an external image signal; an image signal selector for selectively outputting the attenuated external image signal or the complex image signal according to the most significant bit value of the N-bit data; and an output amplifier for amplifying the selected image signal.

The superimposing circuit further comprises: a first compensator for compensating the phase of the modulated first color difference signal and outputting the compensated result into the first mixer; a second compensator for compensating the phase of the modulated second color difference signal and outputting the compensated result into the first mixer; a phase matching portion for generating the first and second control signals to synchronize a color burst signal and RGB input by phase-locking a color carrier wave during superimposing and outputting the first and second control signals to the first and second compensators.

BRIEF DESCRIPTION OF THE DRAWING

The above objects and advantages of the present invention will become more apparent by describing in detail a preferred embodiment thereof with reference to the attached drawing in which.

DETAILED DESCRIPTION OF THE INVENTION

Figure 1:
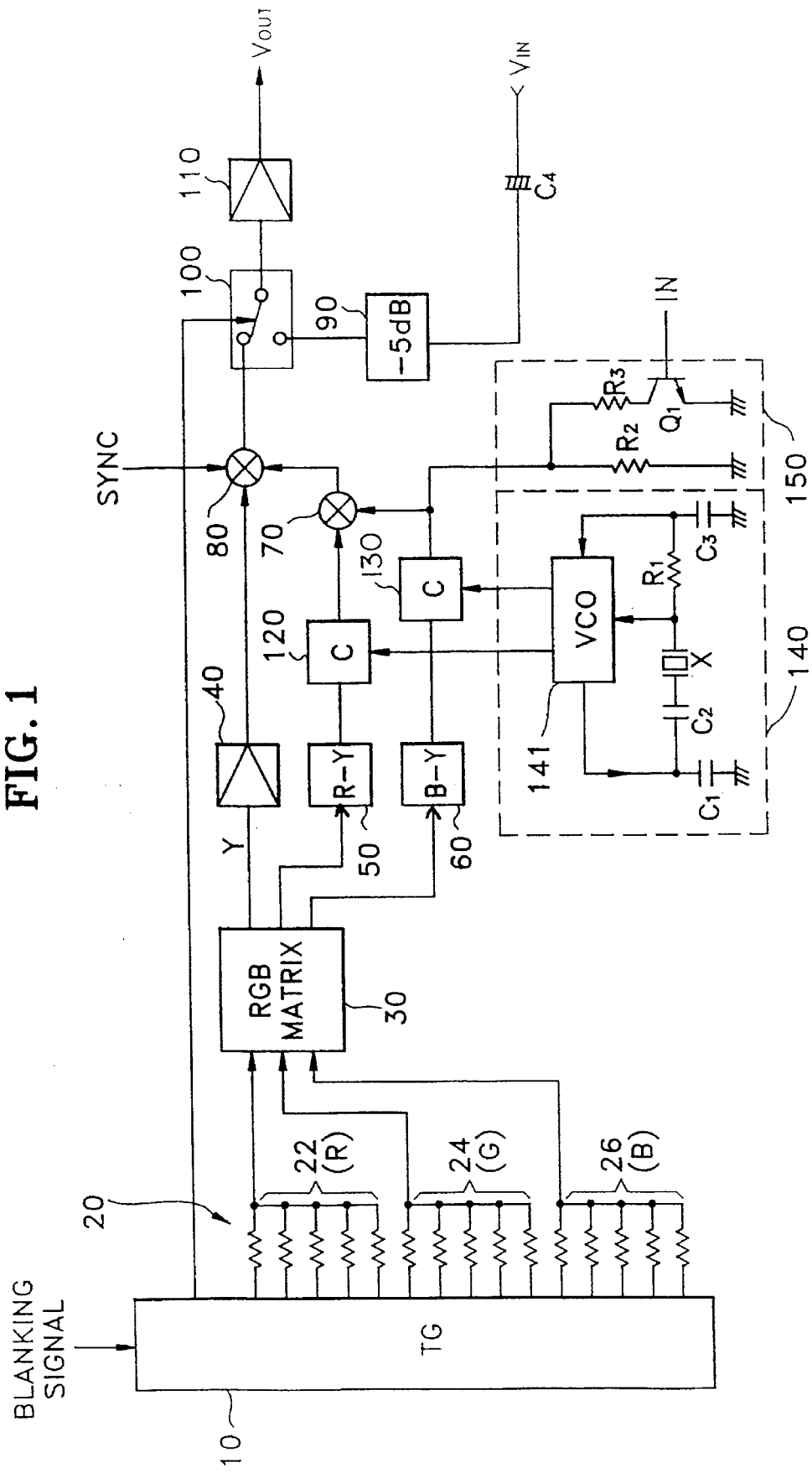
FIG. 1 is a circuit diagram showing a superimposing circuit according to the present invention.

The superimposing circuit of FIG. 1 comprises a sixteen-bit transmission gate (TG) 10, a signal synthesizer 20, an RGB matrix 30, a luminance signal amplifier 40, modulators 50 and 60, a first mixer 70, a second mixer 80, an attenuator 90, an image signal selector 100, an output amplifier 110, a first compensator 120, a second compensator 130 and a phase matching portion 140.

Transmission gate 10 receives the most significant bit of a video selection bit and RGB data consisting of five bits and outputs those in response to a blanking signal. When the most significant bit value is "0", an internal image signal is selected and when the most significant bit value is "1", an external image signal is selected. Signal synthesizer 20 composed of three 5-resistor arrays 22, 24 and 26 receives 5-bit red (R) data, 5-bit green (G) data and 5-bit blue (B) data and generates the synthesized R, G and B signals. RGB matrix 30 receives RGB data and generates luminance signal Y, and first and second color difference signals B-Y and R-Y. The luminance signal is amplified by a predetermined amplification factor by luminance signal amplifier 40, and the first and second color difference signals are modulated by modulators 50 and 60, respectively. The modulated color signals are compensated by first and second compensators 120 and 130 for preventing phase distortion during superimposing. The first and second compensators respond to the first and second control signals generated from phase matching portion 140. Phase matching portion 140 is composed of a voltage-controlled oscillator VCO 141, a quartz-crystal oscillator X of 3.57 MHz, capacitors $C_1$, $C_2$ and $C_3$, and a resistor $R_1$. Here, the first and second color carrier waves are input into VCO 141. Then, the output color carrier waves output from VCO 141 are phase-lock-controlled and the first and second control signals are generated. The phase-compensated modulated color signals are mixed by first mixer 70 and are output as carrier color signals. Burst level adjustment means 150 composed of resistors $R_2$ and $R_3$ and transistor $Q_1$ adjusts the signal level to the value of resistor $R_2$ when the external image signal is input through input port IN and adjusts the signal level to the parallel resistance value of resistors $R_2$ and $R_3$ when the external image signal is not input through input port IN. The carrier color signals are mixed with the amplified luminance signal and the complex synchronizing signal (SYNC) in second mixer 80 and are output as complex image signals. The external image signal is applied to −5 dB attenuator 90 via connection capacitor $C_4$ and is attenuated accordingly. The attenuated external image signal and the complex image signal are selected by image signal selector 100 which is switched at high speed in a pixel unit and are superimposed, in response to the most significant bit from transmission gate 10. The image signal where the complex image signal is superimposed onto the external image signal is amplified in output amplifier 110 to be output.

As described above, according to the present invention, two image signals are superimposed in a pixel unit and the phase distortion during superimposing can be prevented.

What is claimed is:

1. A superimposing circuit comprising:

an N-bit transmission gate for transmitting N-bit RGB data in a pixel unit in response to a blanking signal;

a signal synthesizer for generating R, G and B signals, by separating each component of R, G and B from the N-1 least significant bits of said N-bit RGB data output from said transmission gate;

an RGB matrix for receiving said R, G and B signals and generating a luminance signal, and first and second color difference signals;

a luminance signal amplifier for amplifying said luminance signal;

a pair of modulators for modulating said first and second color difference signals, respectively;

a first mixer for synthesizing said modulated first and second color difference signals and generating a carrier color signal;

a second mixer for synthesizing said carrier color signal, said amplified luminance signal and a complex synchronizing signal and generating a complex image signal;

an attenuator for attenuating an external image signal;

an image signal selector for selectively outputting said attenuated external image signal or said complex image signal according to the most significant bit value of said N-bit RGB data; and an output amplifier for amplifying said selected image signal.

2. A superimposing circuit as claimed in claim 1, further comprising:

a first compensator for compensating the phase of said modulated first color difference signal and outputting the compensated result into said first mixer;

a second compensator for compensating the phase of said modulated second color difference signal and outputting the compensated result into said first mixer; and a phase matching portion for generating first and second control signals to synchronize a color burst signal and RGB input by phase-locking a color carrier wave during superimposing and outputting said first and second control signals into said first and second compensators.

3. A superimposing circuit as claimed in claim 2, further comprising a burst level adjustment means for adjusting the level of the carrier color signal output by said first mixer according to whether the external image signal is input to the burst level adjustment means.

4. A superimposing circuit as claimed in claim 3, wherein said burst level adjustment means comprises:

a transistor having an input port for inputting the external image signal, said transistor being conductive when the external image signal is input to the input port, and being non-conductive when the input image signal is not input to the input port;

a first resistor connected in series to said transistor to form a series transistor-first resistor combination;

a second resistor connected in parallel to the transistor-first resistor series combination, said first resistor and said second resistor having a common node which has a voltage value which is input to said first mixer for adjusting the level of the carrier color signal output by said first mixer;

wherein when the input image signal is input to the input port, the level of the carrier color signal output by said first mixer is adjusted according to a parallel resistance value of said first resistor and said second resistor, and when the input signal is not input to the input port, the level of the carrier color signal output by said first mixer is adjusted according to a resistance value of said second resistor.

\* \* \* \* \*